(12) United States Patent
Beck

(10) Patent No.: US 8,938,745 B2
(45) Date of Patent: Jan. 20, 2015

(54) SYSTEMS AND METHODS FOR PROVIDING MODULAR APPLICATIONS

(75) Inventor: Stefan Beck, Hirschberg (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 13/291,644

(22) Filed: Nov. 8, 2011

(65) Prior Publication Data

US 2013/0117350 A1    May 9, 2013

(51) Int. Cl.
    *G06F 3/00*          (2006.01)
    *G06F 9/44*          (2006.01)
    *G06F 9/46*          (2006.01)
    *G06F 13/00*        (2006.01)
    *G06F 9/48*          (2006.01)
(52) U.S. Cl.
    CPC .................... *G06F 9/4843* (2013.01)
    USPC ........................................................ 719/331
(58) Field of Classification Search
None
See application file for complete search history.

(56) References Cited

U.S. PATENT DOCUMENTS

| 6,978,218 | B1 | 12/2005 | Kolb et al. |
| 7,543,268 | B2 | 6/2009 | Cherdron et al. |
| 7,606,924 | B2 * | 10/2009 | Raz et al. ............... 709/231 |
| 7,664,860 | B2 | 2/2010 | Beck et al. |
| 7,685,603 | B2 | 3/2010 | Singler et al. |
| 7,757,239 | B2 | 7/2010 | Beck |
| 7,797,351 | B2 | 9/2010 | Beck |
| 2007/0050449 | A1 | 3/2007 | Beck |
| 2007/0150839 | A1 * | 6/2007 | Danninger ............ 715/825 |
| 2007/0192157 | A1 * | 8/2007 | Gooch ...................... 705/9 |

* cited by examiner

*Primary Examiner* — H S Sough
*Assistant Examiner* — William C Wood
(74) *Attorney, Agent, or Firm* — Fish & Richardson P.C.

(57) ABSTRACT

The present disclosure involves systems, software, and computer implemented methods for providing modular applications. A first module of multiple modules is received from a server system. Each module includes instructions executable by data processing apparatus to perform operations. Operations are performed by executing the first module. A request to the server system for a second module is transmitted while performing the operations. At least a portion of the second module is received from the server system while performing the operations.

20 Claims, 3 Drawing Sheets

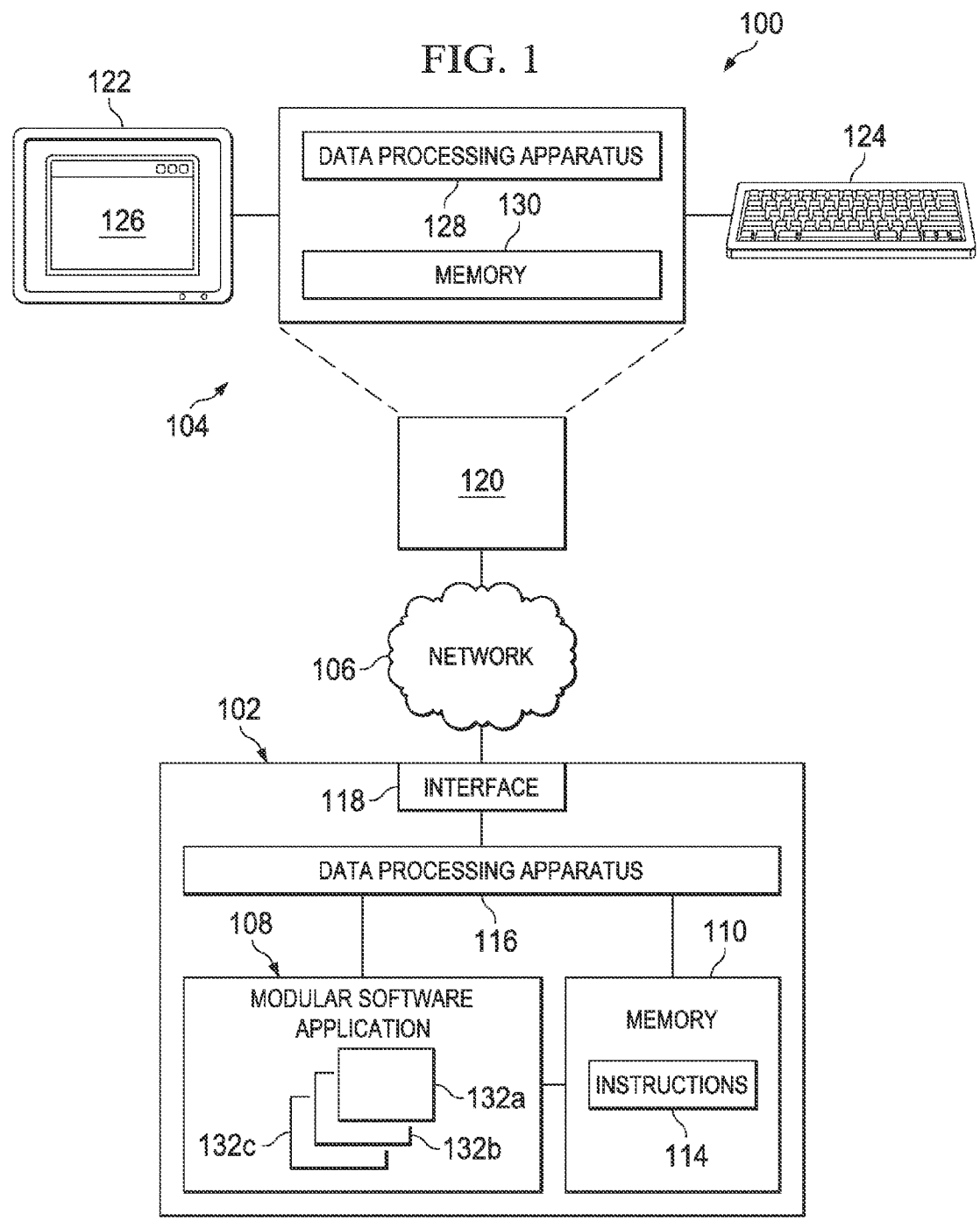

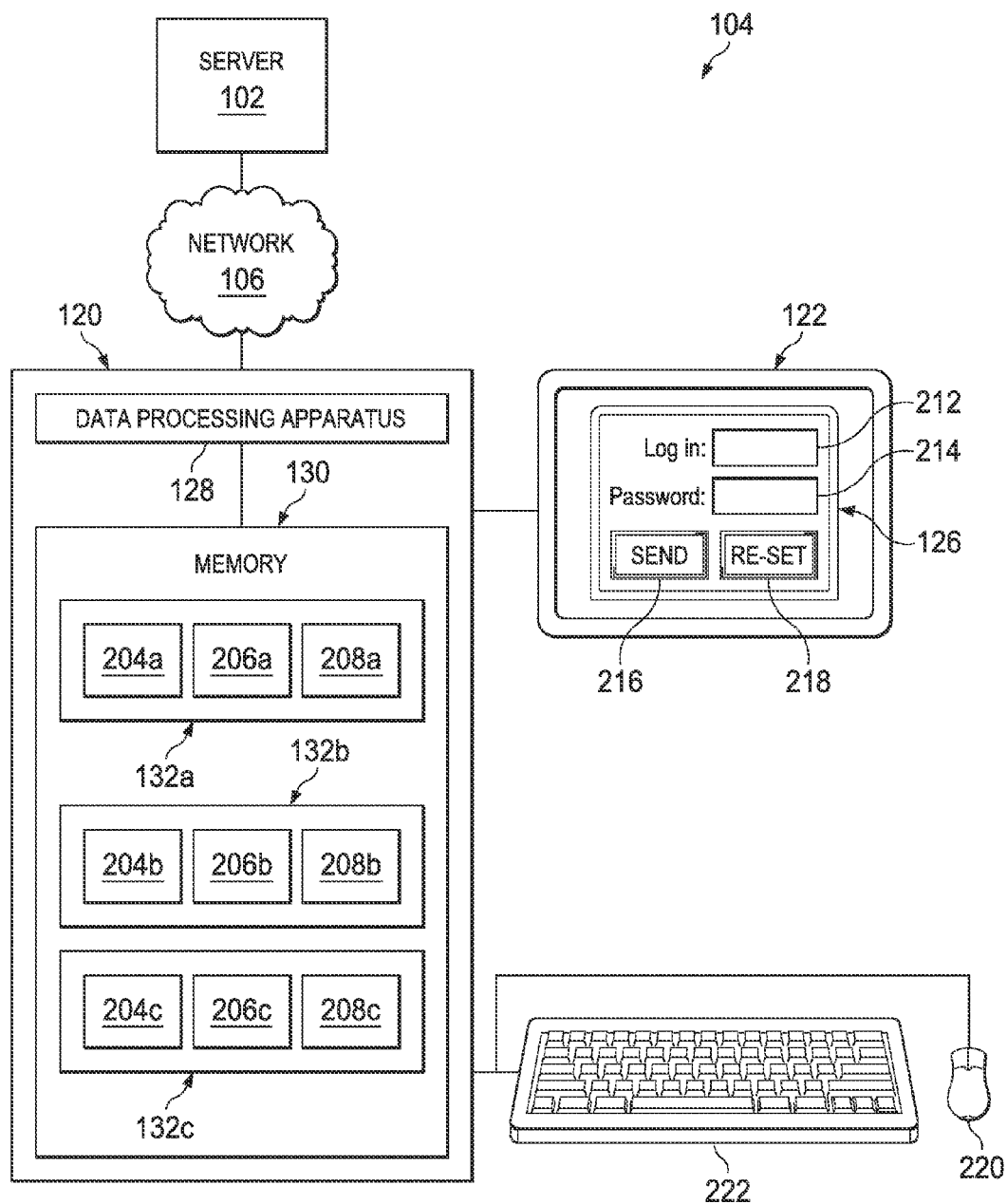

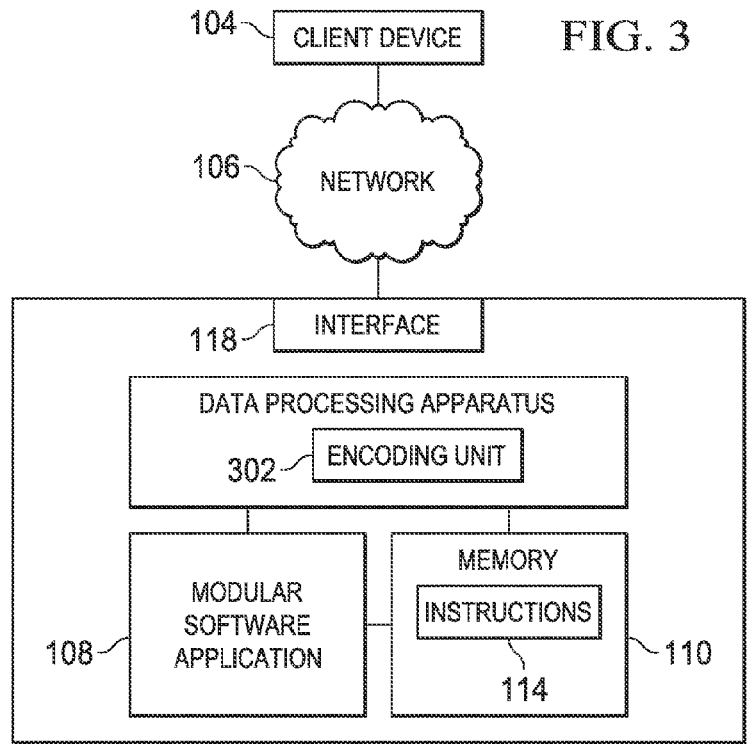
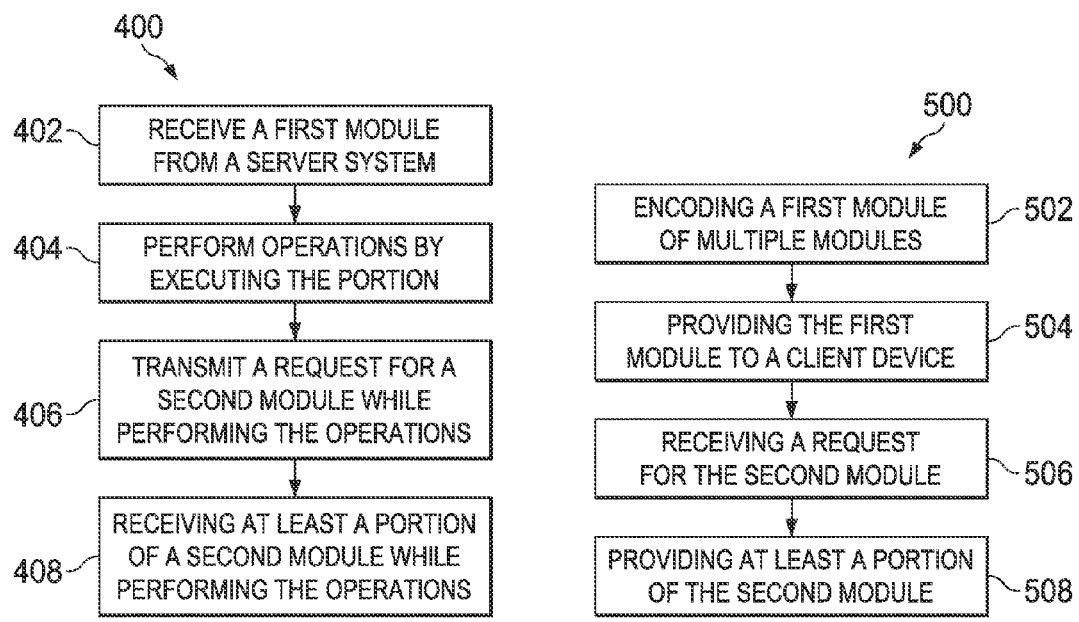
FIG. 4
FIG. 5

SYSTEMS AND METHODS FOR PROVIDING MODULAR APPLICATIONS

TECHNICAL FIELD

The present disclosure relates to software, computer systems, and computer-implemented methods related to providing information over a network.

BACKGROUND

Organizations perform operations, transactions, and business processes using computer software applications, for example, enterprise software. To do so, an organization can create and store computer software applications on server systems connected to client devices through networks, for example, the Internet. The experience of end users who operate the client devices can depend, in part, on a speed with which the software applications interact with the end users. For example, an end user's experience can be enhanced by substantially real-time response to the user's input to the application. Such experiences can depend on, for example, the software application size, a speed of connection between the server system and the client device, hardware features of the server system and the client device, and the like.

In some situations, a computer software application can be created by modular programming in which the application is composed of separate, interchangeable components. The functions of the application are separated into these components (or "modules") such that each module is configured to accomplish a function and includes a set of features to do so. Each module can include one or more interfaces to receive information, for example, from other modules or from end users or both, and to provide output generated by the module to the other modules, to the end user, or both.

A server system can store multiple modules that collectively represent a computer software application. When the server system receives a request to access the computer software application from a client device, the server system can transmit one or more modules to the client device. In situations in which a module includes a large file, the software design framework can initially transfer the large file from the server system (for example, through a local area network with latency) to the client device (for example, into an Internet browser window). Once transferred, the client device can handle end user interactions with the module locally.

SUMMARY

The present disclosure involves systems, software, and computer implemented methods for providing modular applications. A first module of multiple modules is received from a server system. Each module includes instructions executable by data processing apparatus to perform operations. Operations are performed by executing the first module. A request to the server system for a second module is transmitted while performing the operations. At least a portion of the second module is received from the server system while performing the operations.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DESCRIPTION OF DRAWINGS

FIG. 1 illustrates an example environment for implementing various features of systems that can provide or receive modular computer software applications.

FIG. 2 illustrates an example of a client device for executing a modular software application.

FIG. 3 illustrates an example of a server system for encoding a modular software application.

FIG. 4 is a flowchart showing an example process for receiving modules of a modular computer software application.

FIG. 5 is a flowchart showing an example process for providing modules of a modular computer software application.

DETAILED DESCRIPTION

This disclosure generally describes computer systems, software, and computer-implemented methods for receiving or providing modular computer software applications, for example, computer software applications represented collectively by multiple modules. Each module can include instructions, such as computer programs, executable by data processing apparatus to perform operations. A particular module of a computer software application can be configured to perform one or more particular functions, and can include all the instructions to do so.

When a client device requests a modular computer software application from a server system, the client device can initially receive a first module which the client device can execute, and then receive a second module, which the client device can execute, and so on. If an end user provides a request for a first module and the client device waits until the first module has been received in its entirety from the server system before responding to the request, then the end user may experience a delay in interacting with the computer software application. Also, if the client device requests the server system for a second module after executing the first module, the client device may experience a delay in receiving the second module, for example, due to a latency of the connection between the client device and the server system. By implementing techniques described here, such delays may be minimized.

In some implementations, the server system can receive a request for and transmit a first module to the client device. The server system can encode the first module to perform operations when executed by the client device. The operations can include requesting input from an end user, and transmitting a request to the server system for a second module while awaiting the requested input from the end user. By doing so, the client device can receive at least a portion of the second module prior to receiving all of the requested input from the end user. This can enable the client device to execute the portion of the second module shortly after receiving the requested input. While executing the received portion, the client device can also continue to receive remaining portions of the second module. In this manner, the client device can minimize the delay in providing an output to the input received from the user.

As an alternative or in addition to causing the client device to request for portions of modules while awaiting user input, the server system that encodes the first module can cause the client device to request for one or more particular modules of the computer software application during periods in which the client device is inactive (for example, when no user input is received). The server system can determine that the particular modules are likely to be requested by the client device based on navigational paths being followed when the client device executes the first module. By causing the client device to request the specified modules, the server system can further minimize the delay in receiving those modules. In addition, the cost of providing computer software applications hosted on server systems to client devices can be decreased by hosting the applications as multiple modules relative to hosting the application as a single large file. Such cost benefits can be increased when the client device is a mobile device with lesser computational capacities relative to a computer system such as a desktop computer, and when the mobile networks that connect server systems to mobile devices have greater restrictions than networks that connect server systems and the computer systems.

FIG. 1 illustrates an example environment 100 for implementing various features of systems that can provide or receive modular computer software applications. In the environment 100, a server system 102 (for example, a business process server) is connected to a client device 104 (for example, a desktop computer, a laptop computer, a tablet computer, a personal digital assistant, and the like) through one or more networks 106 (for example, the Internet) to provide and receive a modular computer software application 108 that includes multiple modules (for example, a first module 132a, a second module 132b, a third module 132c, and so on). The multiple modules can collectively represent a flexibly packaged, modular computer software application 108. For example, the modular computer software application 108 can be an Internet-based application including multiple modules hosted by a publishing system. In response to a client device, the publishing system can provide one or more or all modules of the Internet-based application as described here. For example, each module can be an Internet web page or a part of an Internet web page of a website hosted by the publishing system.

Each module can include instructions, for example, computer programs, executable by data processing apparatus. For example, a module can include highly interactive applications encoded, for example, using Hyper Text Markup Language 5. The modular software application 108 can additionally include a design framework, coding files, application files, resources, and the like that are executable by data processing apparatus to cause each module and the modular computer software application 108 to perform respective operations.

The server system 102 can include a computer-readable memory 110 that stores the modular software application 108 including the multiple modules (the first module 132a, the second module 132b, the third module 132c), and the instructions 114, for example, the design framework, the coding files, the application files, the resources, and the like. The server system 102 can further include data processing apparatus 116 that can execute the instructions 114 to perform operations. The data processing apparatus 116 can be connected to an interface 118 included in the server system 102 through which the server system 102 can receive or provide (or both) data including requests for the modules and the modules with associated instructions.

The client device 104 can include a processing unit 120 connected to a display device 122 (for example, a liquid crystal display) and input devices 124 (for example, a keyboard, a mouse, a stylus, a touchscreen, and the like). The processing unit 120 can include data processing apparatus 128 and a memory 130 that can store data including instructions executable by the data processing apparatus 128. For example, when the processing unit 120 receives input through the input device 124, the data processing apparatus 128 can execute instructions stored in the memory 130 to generate an output, and cause the display device 122 to display the output in a user interface 126.

The processing unit 120 can transmit requests for modules of the modular software application 108 to the server 102 and receive portions or all of one or more modules, and associated instructions through the network 106. The processing unit 120 can store the instructions in the memory 130 and cause the data processing apparatus 128 to execute the instructions to present output in the display device 122. The environment 100 can include multiple server systems such as server system 102 and multiple client devices such as client device 104 which are inter-connected with each other to receive and provide modular software applications.

FIG. 2 illustrates an example of a client device 104 for executing a modular software application (for example, the modular software application 108). The client device 104 transmits a request to the server 102 for modules (for example, the first module 132a, the second module 132b, the third module 132c, etc.) of the modular software application 108, receives portions of one or more modules in response to the request, and executes the portions as described here to minimize the delay in receiving the modules, and thereby enhancing the user experience of an end user of the client device 104.

In some implementations, when the client device 104 transmits a request for the modular software application 108 to the server 102, the server 102 can initially provide at least a first portion 204a of the first module 132a. The client device 104 can receive and store the first portion 204a of the first module 132a on the memory 130. Alternatively or in addition, the server system 102 can provide multiple portions (for example, a first portion 202a, a second portion 202b, a third portion 202c, etc.) that collectively represent the first module 132a. The first portion 204a can include respective instructions (for example, design framework, code files, resources, and the like) executable by the data processing apparatus 128 to perform corresponding operations.

The client device 104 can perform operations encoded in the first portion 204a when the data processing apparatus 138 executes the first portion 204a. For example, a first portion 204a of the first module 132a can include resources, such as user interfaces, digital video, digital audio, and the like. The client device 104 can execute the first portion 204a of the first module 132a to perform operations. For example, the instructions encoded in the first portion 204a can cause the client device 104 to display a resource, for example, a user interface 126, in the display device 122 that is configured to receive input. Alternatively, or in addition, the client device 104 can display the digital video, play the digital audio, or otherwise render any HTML-based content on the display device 122.

The exemplary operations performed by the client device 104 are described here with reference to requesting input, for example, from an end user of the client device 104. The client device 104 can request the end user to provide input using an input device (for example, a mouse 220, a keyboard 222, a microphone for voice input, or combinations of them). The input can be, for example, one or more of a log-in name and a password, the end user's name, street address, personal information, or any other type of data. After the client device 104 receives the input in the user interface 126, the client device 104 can proceed to execute remaining portions of the first module 132a (the second portion 206a, the third portion 208*a*). In this manner, the first portion 132*a* can cause the client device 104 to wait until the end user provides the input.

In some implementations, the client device 104 can wait for the end user to provide the requested input for a duration. This duration can include a time for the end user to view the user interface and understand the requested input, and a time for the end user to perform the actions associated with providing the input. In some implementations, the duration can begin at a time instant in which the client device 104 displays the user interface 126, and end at a time instant in which the client device 104 detects an end of receipt of all of the requested input. Alternatively, or in addition, the duration can begin when the client device 104 detects a beginning of receipt of a portion of the requested input.

Having viewed the user interface and understood the requested input, when the user begins to provide the requested input, the client device 104 can detect the beginning of the receipt of the portion of the input. When the user stops providing the input or provides another input to submit the input, the client device 104 can detect an end of the receipt of the requested input. In some implementations, the first module 132*a* can encode instructions to cause the client device 104 to wait for a pre-defined duration from a time that the client device 104 displays the user interface 126. The client device 104 can perform additional operations after the pre-defined duration expires. Within this duration, the client device 104 can transmit the request for the portion of the second module 132*b* to the server system 102.

For example, the first module 132*a* can encode instructions to cause the client device 104 to display a log-in interface 126 in the display device 122 requesting a user to provide log-in information. The log-in page can include a first control 212 into which the user can enter a log-in name, a second control 214 into which the user can enter an associated password, a third control 216 that the user can select to provide the entered data for verification (for example, a "SEND" button), and optionally a fourth control 218 that the user can select to re-enter the log-in and password information (for example, a "RE-SET" button). Alternatively, the user interface 126 can include other messages requesting input from the end user, and other controls to enable the user to provide the requested input. The client device 104 can detect a beginning of receipt of a portion of the log-in information when the user accesses the first control 212 and enters the log-in name. The client device 104 can detect an end of receipt of all of the requested input when the user selects the third control 216 to provide the entered log-in information for verification.

In some implementations, the client device 104 can receive the input through the user interface, and determine that the input satisfies one or more pre-defined conditions. The duration for which the client device 104 awaits the user input can include the duration to determine that the input satisfies the pre-defined conditions. For example, when the client device 104 receives the log-in and password information in the user interface 126, the client device 104 can wait to verify that the received log-in and password information is accurate before executing other portions of the first module 132*a* (the second portion 202*b*, the third portion 202*c*) or other modules (the second module 132*b*, the third module 132*c*).

While awaiting the requested input, the client device 104 can transmit a request to the server system 102 for a second module 132*b* of the modular software application 108. In some implementations, the client device 104 can transmit the request to the server system 102 for the second module 132*b* prior to or upon detecting the beginning of the receipt of the portion of the requested input. Alternatively or in addition, the client device 104 can transmit the request upon determining that the user has not completed providing all of the requested input. To do so, for example, the client device 104 can determine that the third control 216 to provide data entered into the user interface has not been selected.

In some implementations, the client device 104 can determine the portion of the modular software application 108 that the client device 104 needs to request (i.e., a portion of the second module 132*b*, in this example) by executing the first module 132*a*. For example, particular instructions included in the first module 132*a* can cause the client device 104 to determine an identity of the portion of the modular software application 108 that the client device 104 needs to request from the server system 102. When the first module 132*a* executes the particular instructions, the client device 104 can determine the identity of the portion and request the same from the server system 102. As described below with reference to FIG. 3, the server system 102 can encode the first module 132*a* with instructions that represent the identity of the subsequent portion of the modular software application 108 that needs to be requested.

The server system 102 can receive the request and, in response, transmit at least a portion of the second module 132*b* (for example, a first portion 204*b*) to the client device 104. The first portion 204*b* of the second module 132*b* can be encoded to be transmitted to the client device 104 through the network 106 faster relative to data (for example, voluminous files) that take longer to transmit, for example, due to network latency. In particular, the client device 104 can receive the first portion 204*b* of the second module 132*b* before receiving all of the requested input through the user interface 126.

In this manner, the client device 102 can receive portions of the second module 132*b* (the first portion 204*b*, the second portion 206*b*, the third portion 208*b*), and perform operations by executing the second module 132*b*. The portions of the second module 132*b* that the client device 104 receives can provide only those features that the client device 102 determines that an end user will use. The server system 102 need not provide other features of the second module 132*b* that the client device 104 will not execute. The client device 102 can request another portion of the second module 132*b* when the client device 102 determines that a user will likely request the other portion. Alternatively, or in addition, the client device 102 can request the other portion in response to an event, for example, a particular end user interaction or input. The client device 102 can do so when executing the previously received portion of the second module 132*b*. Then, the server system 104 can provide the other portion before receiving the request from the user for the other portion. In this manner, initially, the client device 102 can request and the server system 104 can provide a minimum set of features of the computer software application 108 that the client device 102 can execute. As the client device 102 executes the minimum set of features, the client device 102 can request and the server system 104 can provide additional features before the user requests the features.

From an end user's perspective, the client device 104 performed the operations associated with the modular software application 108, specifically, those associated with the second module 132*b*, shortly after providing the requested input into the user interface 126 with minimal delay. Consequently, the end user's experience may be enhanced. For example, the operations associated with the portions of the second module 132*b* that the client device 104 receives can include displaying a user interface (such as, an Internet explorer window) without any information. Subsequently, when the client device 104 receives additional portions of the second module 132*b* from the server system 102, then the client device 104 can display additional resources in the user interface by performing operations associated with the additional portions. Here too, from the end user's perspective, the client device 104 performed an operation associated with the modular software application 108 with minimal to no delay.

The second module 132b can be encoded similarly to the first module 132a to request input from an end user, transmit a request to the server system for a third module 132c while awaiting the requested input, and receiving at least a portion of the third module 132c (for example, a first portion 204c, a second portion 206c, or a third portion 208c) from the server system 102 before receiving all of the requested input. Alternatively or in addition, the second module 132b can be encoded to transmit a request to the server system for the third module 132c when the client device 104 is inactive (i.e., is not interacting with the end user).

FIG. 3 illustrates an example of a server system 102 for encoding a modular software application (for example, the modular software application 108). As described previously, the server system 102 can store multiple modules of a modular software application 108, and provide a first module to a client device 104 that is configured to execute the first module. The server system 102 can include an encoding unit 302 that encodes each module of the modular software application 108. In some implementations, the encoding unit 102 can encode the first module to include instructions executable by data processing apparatus to perform operations, and transmitting a request for a second module while performing the operations. For example, the operations can include displaying a user interface and requesting that input be provided in the user interface. After the server system 102 provides the first module to the client device, the server system 102 can receive the request for the second module, for example, when the client device executes the first module. In response to receiving the input, the server system 102 can provide at least a portion of the second module.

In some implementations, the encoding unit 302 can encode the first module to include instructions that identify the second module. For example, when the client device 104 receives and executes the first module, the client device 104 determines the identity of the second module from the encoded instructions. The encoding unit 302 can encode one or more navigational paths in the first module, each of which can be a sequence of events that are likely to occur when the client device executes the first module. For example, the events in a navigational path can represent targets to which an end user is likely to navigate while interacting with the modular software application. When an event has occurred (for example, when the end user has navigated to a particular target), the user may then need a particular resource to further interact with the modular software application 108. The encoding unit 302 can encode the first module such that, when the client device 104 determines that the user is likely to navigate to the particular target (or prior to doing so), the client device 104 can transmit a request for the second module which includes the particular resource (for example, a log-in user interface) and associated instructions to execute the resource (for example, display the log-in user interface).

A navigational path as described in the example above is a conditional navigational path in that the client device 104 needs to determine that the end user has navigated to the particular target (for example, a user interface) to transmit a request for the second module. In some implementations, the encoding unit 302 can include other navigational paths that are default navigational paths in the first module. A default navigational path is one that includes multiple events that are likely to occur when the client device 104 executes the first module, but need not occur for the client device 104 to transmit a request for the second module. In other words, the client device 104 can transmit the request at any time of inactivity.

An example of a conditional navigational path encoded in a first module can have the following format: query ("View1"), where "View1" refers to a resource. The path indicates that, when the client device 104 executes the first module, the client device 104 determines if the end user has navigated to a particular target. If yes, then the client device 104 transmits a request for the resource represented by "View1." An example of a default navigational path encoded in the first module can have the following format: query ("View2", "default"), where "View2" refers to another resource. The path indicates that, when the client device 104 executes the first module, the client device 104 can transmit a request for the resource represented by "View2" during any period of inactivity and regardless of whether or not the user has navigated to any particular target.

FIG. 4 is a flowchart showing an example process 400 for receiving modules of a modular computer software application. The process 400 can be implemented as computer program instructions executable by data processing apparatus, for example, data processing apparatus 128 of the client device 104. The process 400 receives a first module of multiple modules from a server system (step 402). Each module includes instructions executable by data processing apparatus to perform operations. The process 400 performs operations by executing the first module (step 404). The process 400 transmits a request to the server system for a second module of the multiple modules while performing the operations (step 406). The process 400 receives at least a portion of the second module from the server system while performing the operations (step 408).

FIG. 5 is a flowchart showing an example process 500 for providing modules of a modular computer software application. The process 500 can be implemented as computer program instructions executable by data processing apparatus, for example, data processing apparatus 116 of the server system 102. The process 500 encodes a first module of multiple modules to include instructions executable by data processing apparatus to perform operations (step 502). The operations include requesting input, and transmitting a request for a second module of the multiple modules upon requesting the input. The process 500 provides the first module to a client device that is configured to execute the first module (step 504). The process receives the request for the second module when the first module is executed (step 506). The process 500 provides at least a portion of the second module in response to receiving the request (step 508).

In some implementations, the server system 102 and the client device 104 can be configured to implement the operations described above with reference to a single module. For example, upon receiving a request for a first module from the client device, the server system can transmit a portion of the first module that the client device can execute to provide an output in response to receiving the request. The server system can configure the transmitted portion to be quickly delivered to the client device to reduce a delay between a time that the client device 104 receives the request from the user and a time that the client device presents an output of executing the first portion. The server system can additionally configure the transmitted portion to request input from the user when executed by the client device. While awaiting the requested input from the user, the server system can transmit remaining portions of the first module.

The portion of the first module that the server system 102 initially sends to the client device 104 can include a minimal set of instructions required to perform the step requested by the user. For example, the client device 104 can receive input to access a web page of a website and send a request for the web page to the server system 102. Initially, the server system 102 can provide the minimal set of HTML5 code and associated resources that the client device 104 needs to display a user interface in the display device. In this minimal set, the server system 102 can include instructions to cause the client device 104 to transmit a request for additional portions. The instructions can include multiple navigational paths, each including at least one event that will likely occur based expected on user input.

The client device 104 can receive the input from the user, and determine that the input corresponds to an event in one of the navigational paths. The occurrence of the event can identify the portion of the first module that the client device 104 needs to request from the server system 102. Subsequently, as the user is entering input into the user interface, the client device 104 can transmit a request for the identified portion of the first module. In some situations, the request to the server system 102 can be for the remaining portions of the first module or one or more portions or all of other modules.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to receive a modular application, the method comprising:
   receiving a first module of a plurality of modules from a server system, wherein each module includes instructions executable by data processing apparatus to perform operations;
   performing operations by executing the first module, the operations including providing a plurality of resources included in the first module;
   tracking a navigation of one or more of the plurality of resources included in the first module;
   determining that a resource of the plurality of resources has been navigated to;
   in response to determining that the resource of the plurality of resources has been navigated to, transmitting a request to the server system for a second module of the plurality of modules while performing the operations by executing the first module; and
   in response to transmitting the request, receiving at least a portion of the second module from the server system while performing the operations by executing the first module.

2. The method of claim 1, wherein performing the operations by executing the first module comprises displaying a resource configured to receive input.

3. The method of claim 2, wherein performing the operations by executing the first module further comprises:
   receiving the input through the displayed resource; and
   determining that the input satisfies one or more pre-defined conditions.

4. The method of claim 1, wherein the operations include requesting input, and performing the operations include awaiting the requested input.

5. The method of claim 4, wherein awaiting the requested input comprises:
   detecting a beginning of receipt of a portion of the requested input; and
   detecting an end of receipt of all of the requested input.

6. The method of claim 5, wherein transmitting the request to the server system for the second module while awaiting the requested input comprises transmitting the request prior to or upon detecting the beginning of the receipt of the portion of the requested input.

7. The method of claim 5, further comprising:
   displaying a user interface configured to receive the input, wherein detecting the beginning of receipt of the portion of the requested input comprises detecting a selection of the user interface; and
   displaying a control adjacent the user interface, wherein detecting the end of receipt of all of the requested input comprises detecting a selection of the control.

8. The method of claim 1, further comprising:
   receiving the second module from the server system; and
   performing operations by executing the second module.

9. The method of claim 1, wherein the plurality of modules collectively represent a flexibly packaged, modular computer software application executable by data processing apparatus.

10. The method of claim 1, wherein the first module includes instructions to perform operations including displaying a log-in interface, and wherein performing the operations includes requesting log-in information to be provided in the log-in interface.

11. A computer-implemented method to provide a modular application, the method comprising:

encoding a first module of a plurality of modules to include instructions executable by data processing apparatus to:
perform operations including providing a plurality of resources, and determining the identity of the second module, and
transmit a request for a second module of the plurality of modules in response to determining that a selectable resource of the plurality of resources has been selected; and while performing the operations;
providing the first module to a client device that is configured to execute the first module;
receiving the request for the second module when the first module is executed to perform the operations and transmit the request and when the selectable resource has been selected; and
providing at least a portion of the second module in response to receiving the request.

12. The method of claim 11, further comprising encoding the first module to include instructions that identify the second module.

13. The method of claim 11, further comprising encoding the first module to include a particular event such that the request for the second module is transmitted only when the particular event has occurred.

14. The method of claim 13, wherein the particular event is an execution of a particular instruction, and wherein the method further comprises determining that the particular event has occurred upon determining that the particular instruction has been executed.

15. The method of claim 11, further comprising encoding the first module to request input through the resource when the resource is displayed.

16. The method of claim 15, wherein the resource is a log-in user interface, and wherein encoding the first module to perform operations include encoding the first module to request that input be provided in the log-in user interface.

17. A non-transitory computer-readable medium tangibly encoding computer program instructions executable by data processing apparatus to perform operations comprising:

receiving a first module of a plurality of modules from a server system, wherein each module includes instructions executable by data processing apparatus to perform operations, the first module including instructions executable to determine that a resource included in the first module has been navigated to;
performing operations by executing the first module, the operations including executing the instructions to determine that the resource included in the first module has been navigated to;
in response to executing the instructions to determine that the first module has been navigated to:
transmitting a request to the server system for the second module of the plurality of modules while performing the operations by executing the first module; and
receiving at least a portion of the second module from the server system while performing the operations by executing the first module.

18. The medium of claim 17, wherein the resource is configured to receive input.

19. The medium of claim 18, wherein performing the operations by executing the first module further comprises:
receiving the input through the displayed resource; and
determining that the input satisfies one or more pre-defined conditions.

20. The medium of claim 17, wherein the operations include requesting input, and performing the operations include awaiting the requested input.

* * * * *